United States Patent [19]
Dreyer et al.

[11] Patent Number: 5,790,834
[45] Date of Patent: Aug. 4, 1998

[54] APPARATUS AND METHOD USING AN ID INSTRUCTION TO IDENTIFY A COMPUTER MICROPROCESSOR

[75] Inventors: Robert S. Dreyer, Sunnyvale; Donald B. Alpert, Santa Clara, both of Calif.

[73] Assignee: Intel Corporation, Santa Clara, Calif.

[21] Appl. No.: 938,288

[22] Filed: Aug. 31, 1992

[51] Int. Cl.⁶ .............................. G06F 7/04; G06F 9/455
[52] U.S. Cl. ............... 395/500; 395/183.06; 395/182.08
[58] Field of Search ..................... 395/800, 200, 395/550, 500, 425, 325, 275, 250, 375, 575, 725, 775, 800.42, 652, 182.08, 568, 183.04, 394, 183.06, 800.11, 800.23; 364/DIG. 1, DIG. 2

[56] References Cited

U.S. PATENT DOCUMENTS

| | | | |
|---|---|---|---|
| 4,853,844 | 8/1989 | Kono | 395/500 |
| 4,866,769 | 9/1989 | Kano | 364/DIG. 1 |
| 4,964,074 | 10/1990 | Suzuki et al. | 395/500 |
| 4,967,346 | 10/1990 | Freidin | 395/500 |
| 4,970,640 | 11/1990 | Beardsley et al. | 364/DIG. 1 |
| 4,974,191 | 11/1990 | Amirghodsi et al. | 704/8 |
| 5,113,518 | 5/1992 | Durst, Jr. et al. | 395/550 |
| 5,121,486 | 6/1992 | Kurihara et al. | 395/325 |
| 5,144,551 | 9/1992 | Cepulis | 395/677 |
| 5,163,145 | 11/1992 | Parks | 395/500 |
| 5,214,652 | 5/1993 | Sutton | 395/182.08 |
| 5,287,531 | 2/1994 | Rogers, Jr. et al. | 395/289 |
| 5,408,611 | 4/1995 | Kim | 395/500 |
| 5,426,767 | 6/1995 | Crosswy | 395/500 |
| 5,459,854 | 10/1995 | Sherer et al. | 395/651 |

FOREIGN PATENT DOCUMENTS

| | | |
|---|---|---|
| 0313848B1 | 5/1989 | European Pat. Off. . |
| 0351961A2 | 1/1994 | European Pat. Off. . |
| 3624373C2 | 1/1987 | Germany . |
| 2230362 | 10/1990 | United Kingdom . |
| 2264375 | 8/1993 | United Kingdom . |

OTHER PUBLICATIONS

*International Business Machines' Enterprise Systems Architecture/370: Principles of Operation,* Publication No. SA22-7200-0, File No. S370-01, First Edition, Aug. 1988.

*International Business Machines Technical Newsletter,* Newsletter No. SN22-5279, Apr. 17, 1989, Base Publication No. SA 22-7200-0, File No. S370-01.

*International Business Machines Technical Newsletter,* Newsletter No. SN22-5342, Dec. 15, 1989, Base Publication No. SA22-7200-0, File No. S370-01.

*Primary Examiner*—Daniel H. Pan
*Attorney, Agent, or Firm*—Blakely, Sokoloff, Taylor & Zafman

[57] ABSTRACT

An identification apparatus and method for identifying the microprocessor, including a read-only memory for storing microprocessor ID data having data fields for identifying the microprocessor, and control logic for executing an ID instruction that reads the microprocessor ID data from the read-only memory and stores it in a register that can be selectively read by a programmer. The identification apparatus and method also include an ID flag indicative of implementation of the ID instruction in the microprocessor, and a test flag program for testing the ID flag to determine whether or not to execute the ID instruction. The method is available at any time while the microprocessor is operating, for example during initialization of the system software, installation of a program, or while a program is running. Once a microprocessor has been identified, features appropriate to the specific microprocessor can be enabled, and work-around programs can be installed. The method prevents execution of the ID instruction on microprocessors that do not have the identification system, and prevents execution of the test flag program on microprocessors that do not have a test flag location. The invention is particularly useful for groups of compatible microprocessor families whose development is continually advancing with introduction of new families and models.

26 Claims, 4 Drawing Sheets

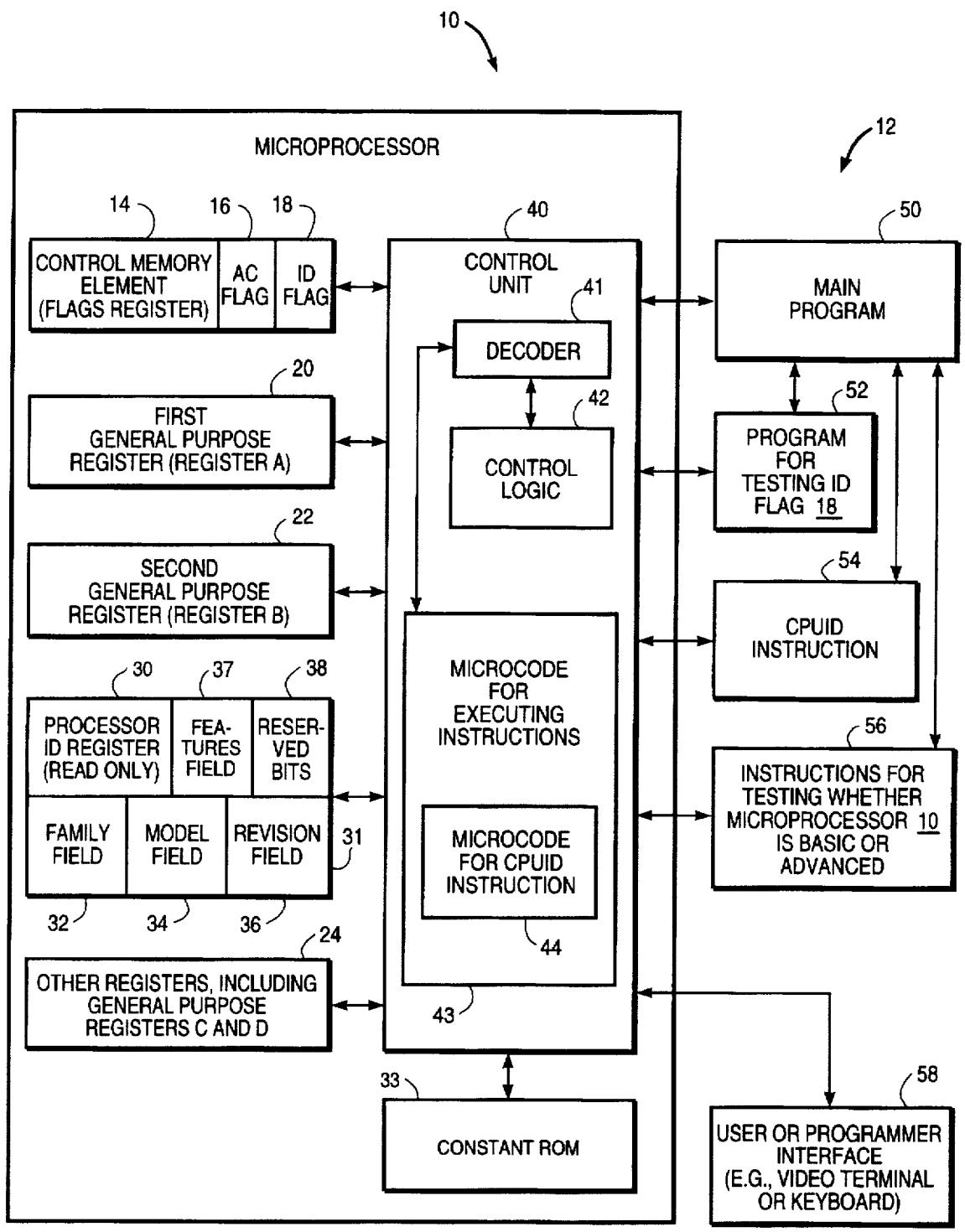
FIG_1

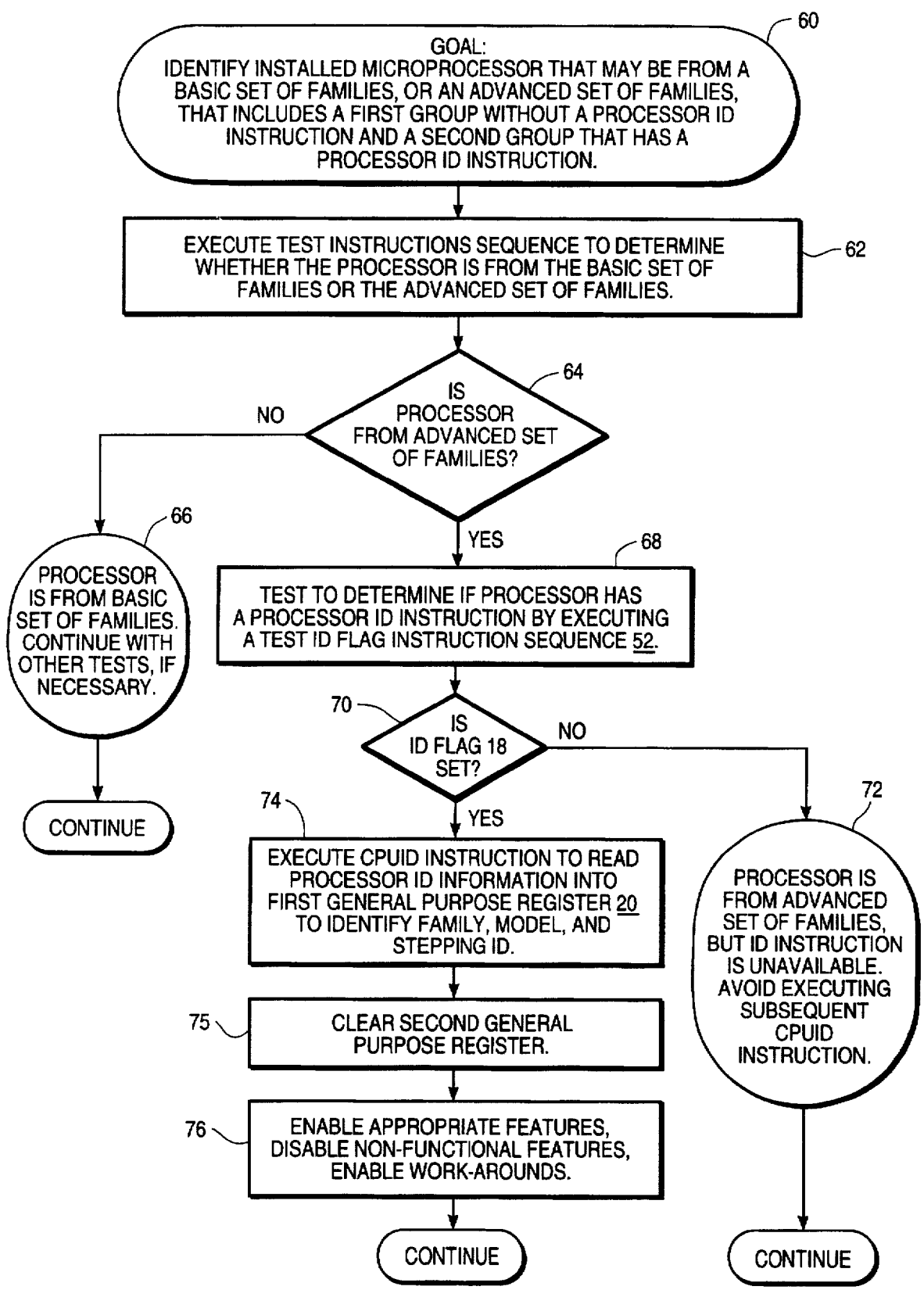
FIG_2

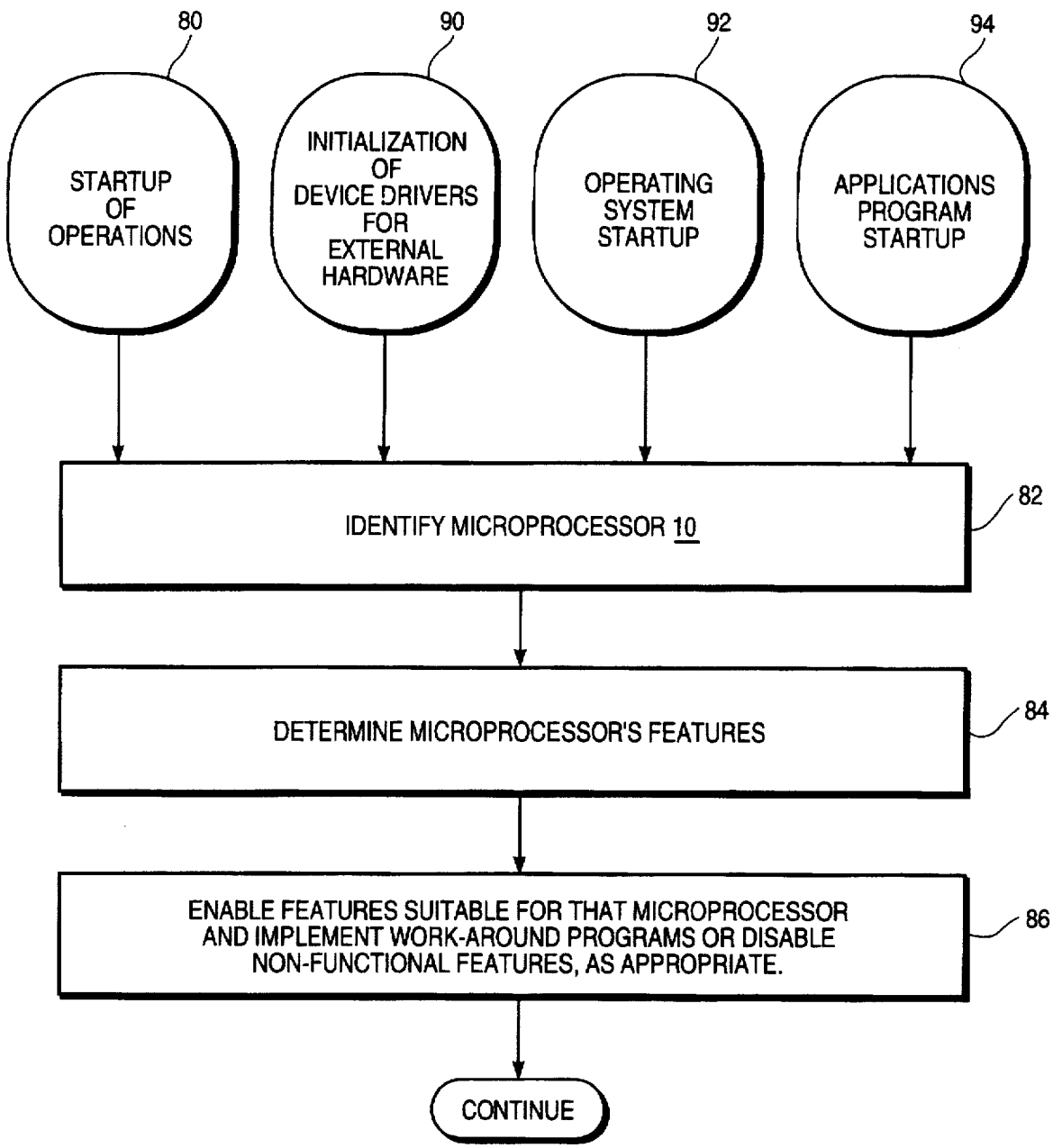
FIG_3

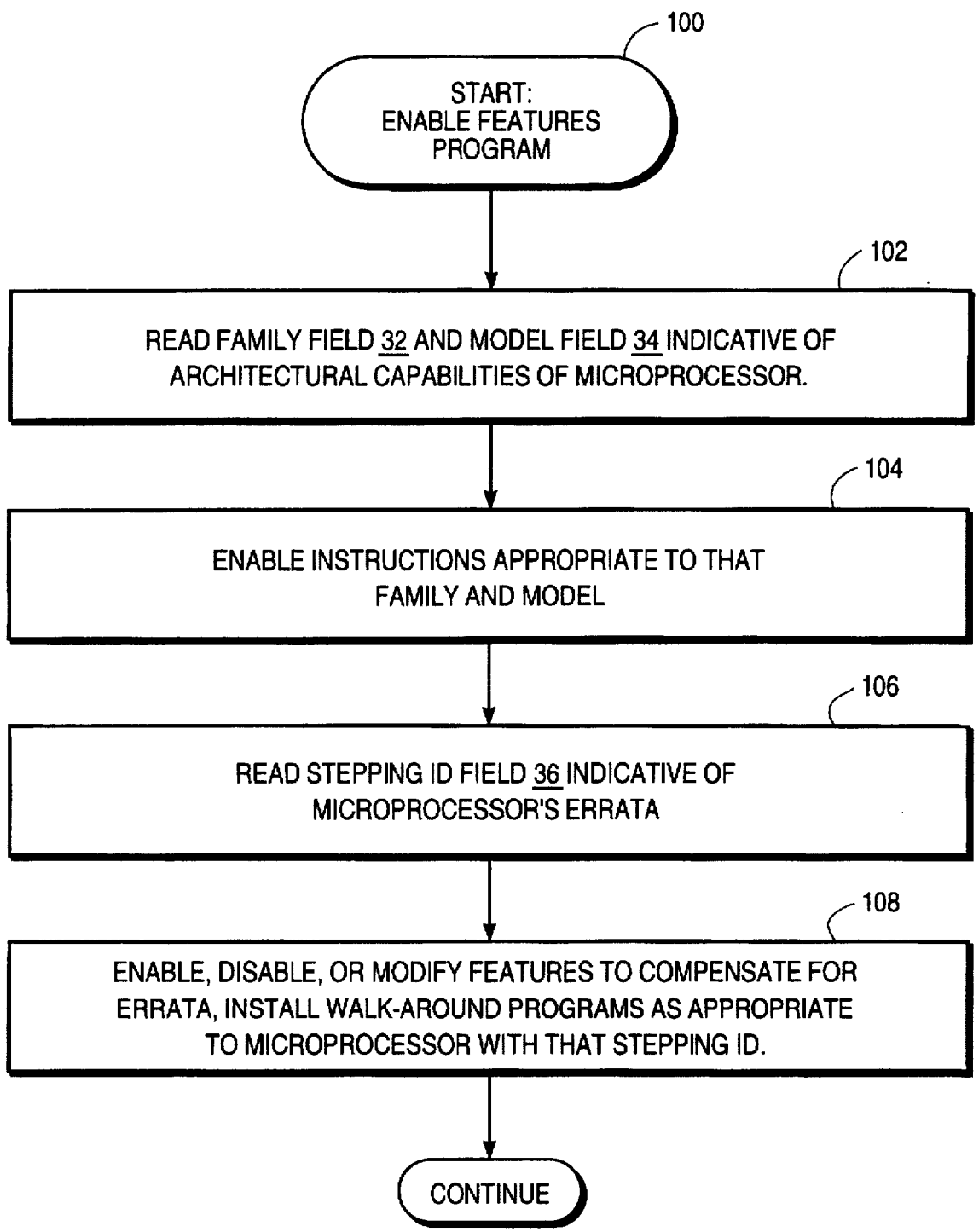
FIG_4

APPARATUS AND METHOD USING AN ID INSTRUCTION TO IDENTIFY A COMPUTER MICROPROCESSOR

BACKGROUND OF THE INVENTION

1. Field of the Invention

The present invention relates to an apparatus and method for identifying a computer microprocessor during start-up and operation. Once identified, features appropriate to the identified computer microprocessor can be enabled.

2. Description of Related Art

During computer operation, identifying the processor in a particular computer system is useful. During initialization and boot up operations, it is important to identify the microprocessor so that particular features can be installed by the initialization software. Furthermore, it may be useful while installing or running software to identify the microprocessor. The features of the microprocessor that are available to the software are highly dependent upon the family and model of microprocessor, and once identified, those features can be better utilized.

In addition to the family and model of microprocessor, it may be useful to know the version, or "stepping" of the microprocessor. A microprocessor's "stepping ID" identifies its version. For example, the microprocessor may have been manufactured in several different versions, each version being identified with a different stepping ID. During the time that a microprocessor is manufactured, several versions of a microprocessor are often introduced to correct bugs or other microprocessor problems that had appeared in earlier versions. Often, these bugs are discovered only after a microprocessor is in production when it is too late for correction. Bugs may affect the microprocessor's response to certain instructions or certain sequences of instructions. It is useful to know a microprocessor's stepping ID, so that instructions and features affected by that bug are not enabled. Furthermore, once a microprocessor is identified by its stepping ID, then its bugs are known and compensation software can be installed. Software fixes that compensate for the existence of a bug are sometimes called "work-arounds." For example, if it is known that a "PUSHA" followed by a "POPA" will create an exception, a solution is to insert a "NOP" (no operation) between the two instructions.

In order to identify the microprocessor during initialization of a computer, previous microprocessors have imbedded therein a constant ROM with an ID code that is read into a register of the computer microprocessor during power-up. After the ID code is read, the contents of the register are over-written by the initialization software. Furthermore, the contents of the constant ROM are unavailable for all other purposes, in part due to compatibility requirements. A problem with this approach is that this ID code is available only during the initialization and is not available at any other time.

Previous methods of identifying a microprocessor are based on a case-by-case, ad hoc approach. For example, if a first model always set a particular bit to zero, and the second model always set this particular bit to one, then this bit may be tested to determine whether the microprocessor is the first model or the second model. In order to determine the stepping ID, a more complicated approach often was necessary. For example, a series of program steps could be executed that detect the presence of the bug, and thereby identify the microprocessor as having a particular stepping. A wide variety of often inconsistent methods for determining bugs have been developed by the different software companies. These methods, which were developed for earlier generations of microprocessors, may produce the wrong result when used with later generations.

Introduction of new families and models over the years has required the software that identifies an installed microprocessor to became more complicated and time-consuming. For example, the INTEL x86 family of microprocessors includes the 8086, the 80286, the Intel386™ ("i386™"), and the Intel486™ (i486™) microprocessor families. Within each of these families, there may be two or more models such as the "SX™," or "DX™". Each model may have three, four, or more versions associated therewith, each having a different stepping ID.

In order to identify the family, model, and stepping ID in the past INTEL x86 microprocessors, a series of instructions are executed in sequence. For example, the code may first detect whether the microprocessor is a 8086 microprocessor, or a 80286 microprocessor or higher. By a process of elimination it would determine first that it was not the 8086 microprocessor, and therefore the microprocessor would be model 80286 microprocessor or higher. The sequence of operations proceeds, often consuming a large number of steps and time, before the exact model and stepping of the microprocessor is known. This complicated process requires a great deal of programmer's time and careful implementation. Furthermore, the sequences of operations are not completely reliable in identifying the processor. Particularly with future generations of microprocessors, the methods may not operate as anticipated. For example, sequences that rely on instruction timings in prior generations may not produce the expected results in future generations that will be developed.

With the latest microprocessors, the ad hoc method of distinguishing between microprocessors was not successful due to a lack of discernible, dependable differences. In terms of the INTEL microprocessors, it may be difficult or even impossible to use the ad hoc methods to detect the difference between the i486™ microprocessor and future microprocessor families now in development.

An additional problem in identifying a microprocessor and developing a mechanism to identify a microprocessor is the compatibility requirement. Vendors of computer software prefer to sell only one version of their software. This one version must be operable on any type of microprocessor within a particular microprocessor family or group of families. Particularly, it is highly advantageous if software developed for any one of the above mentioned families of INTEL microprocessors can run on all the microprocessors in the group, including microprocessors not yet developed. In other words, later-developed software must be operable on earlier-developed microprocessors, and earlier-developed software must be operable on later-developed microprocessors. If the software attempts to process an instruction that is not defined for that microprocessor, an "illegal opcode" exception will usually arise. When that type of exception occurs, the microprocessor generally does not know what to do except to stop all further processing.

It would be an advantage to have a reliable instruction or a sequence of instructions for identifying a microprocessor and its stepping ID that does not rely on ad hoc methods. Such an instruction, or a sequence of instructions can be used to unambiguously determine features available on the microprocessor. Furthermore, it would be an advantage if this instruction sequence, when attempted to be run on previous microprocessor generations that do not implement the instruction, avoids catastrophic failure (e.g., an illegal opcode) that would otherwise cause a program to be prematurely terminated.

SUMMARY OF THE INVENTION

An object of the present invention is to provide an identification apparatus and method for identifying a microprocessor during operation. The identification apparatus may provide information such as the microprocessor's family, model, and stepping ID, on demand. Information directly indicative of features may also be included. System-level programmers, application programmers, users, and others may benefit from ready access to the identification information. By specifically identifying the microprocessor, the method provides a simple, reliable way to determine architectural features that are available. Therefore, features appropriate to the specific microprocessor can be enabled, and programs or code sequences to work-around the bugs can be installed. The method is available at any time while the microprocessor is operating, for example during initialization of the system software, installation of a program, or while a program is running. For microprocessors in which it is implemented, a standardized method is provided for identifying the microprocessor, in contrast to the wide variety of methods used previously.

The identification system is particularly useful when implemented in microprocessor families whose development is continually advancing with the introduction of newer models and families. The identification method can be programmed in software and is compatible with older families as well as the newer families that implement the identification circuitry. In other words, the identification software can be run without causing an exception on older processors that did not implement the identification system and method. Furthermore, new versions of some of the older models can be retrofit with the identification circuitry to provide identification information. The identification system is useful in multi-mode microprocessors, and can be used from within any mode of the microprocessor's operation. The system is extensible, and in future models, the amount of ID information can be increased.

The identification apparatus comprises a register for storing and reading data, a read-only memory means for storing microprocessor ID data including data fields for identifying the microprocessor, a decoder for receiving an ID instruction, and control circuitry for executing the ID instruction received from the decoder, including means for reading the microprocessor ID data from the read-only memory means and storing it in the first register. The identification apparatus may also comprise a read/write memory element including an ID flag indicative of the existence of the control circuitry, and a test means for testing the ID flag.

The read-only memory means may include a processor ID register formed in the microprocessor to hold the microprocessor ID data. Alternately, the microprocessor data may be stored in constant ROM that holds data used by microcode instructions stored in microcode ROM. Preferably the microprocessor ID information is stored in the processor ID register, which is a separate register that can be modified more easily in subsequent models than the constant ROM. The read-only memory means may include reserved bits that have assigned locations, but are not implemented to include data. The reserved bits are provided to avoid compatibility problems that would be encountered if the size of the processor ID register were expanded in future microprocessors. The data fields in the read-only memory means may include a family field indicative of the microprocessor's family, a model field indicative of the microprocessor's model, and a revision field indicative of the microprocessor's errata or stepping ID.

In a more specific embodiment, the identification apparatus for a microprocessor comprises one or more general purpose registers for storing and reading data, a microprocessor ID memory element including data fields that identify the microprocessor, a decoder for receiving instructions, a control means for executing instructions received from the decoder, including a CPUID instruction, a read/write memory element including an ID flag indicative of the existence of the CPUID instruction, a test program for supplying a sequence of instructions that tests the ID flag, and a program for supplying the CPUID instruction.

A computer-implemented method for identifying a microprocessor includes distinguishing between a microprocessor in a first group and a microprocessor in a second group. Microprocessors in the first group do not implement a microprocessor ID instruction, but those in the second group do have a microprocessor ID instruction. The method includes the steps of executing a flag test instruction sequence that tests an ID flag to determine whether the microprocessor is in the first group or the second group. This step avoids generation of an illegal opcode exception that would be generated if the ID instruction were attempted to be executed on a prior microprocessor which does not implement the CPUID instruction. If execution of the flag test instruction sequence indicates that the CPUID instruction has not been implemented, then the microprocessor is identified as a member of the first group, and program steps are executed to avoid execution of the CPUID instruction. However, if execution of the flag test instruction sequence indicates that the ID instruction has been implemented, then the microprocessor is identified as a member of the second group, and the program allows execution of the CPUID instruction, which supplies the contents of the microprocessor ID memory element to a general purpose register. In order to allow room for future expansion of the processor ID data, additional general purpose registers are cleared to provide a potential destination for the additional ID data.

A more specific computer-implemented method for identifying a microprocessor first distinguishes between a basic set of families and an advanced set of families before testing the ID flag. The basic set of families does not have a bit location for the ID flag in the flags register, and therefore any attempt to test the ID flag may create an illegal opcode exception. If the microprocessor is identified as a member of the basic set of families, then the test flag instruction sequence is avoided as well as execution of the CPUID instruction. Then, other tests may be performed as appropriate to more particularly identify the basic microprocessor. The advanced set of families does have a bit location for the ID flag, and therefore if the microprocessor is identified as a member of that set, then the test flag instruction sequence can be performed to distinguish whether the microprocessor is a member of the first or the second group, and the CPUID instruction is executed accordingly.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purpose, and may not have been selected to delineate or circumscribe the inventive subject matter, resort to the claims being necessary to determine such inventive subject matter.

BRIEF DESCRIPTION OF THE DRAWINGS

FIG. 1 is a block diagram of the architecture of a microprocessor including a microprocessor ID register for storing identification information.

FIG. 2 is a flow chart of method steps to determine the microprocessor ID.

FIG. 3 is a flow chart illustrating identification of the microprocessor and enabling features in several different contexts.

FIG. 4 is a flow chart of method steps that may occur in a microprocessor following obtaining identification information.

DETAILED DESCRIPTION OF THE PREFERRED EMBODIMENT

FIGS. 1 through 4 of the drawings disclose various embodiments of the present invention for purposes of illustration only. One skilled in the art will readily recognize from the following discussion that alternative embodiments of the structures and methods illustrated herein may be employed without departing from the principles of the invention.

Reference is made to FIG. 1 which is a block diagram of a microprocessor 10 and related software illustrated generally at 12. The microprocessor 10 includes a plurality of registers including a read/write memory element 14 (flags register). The flags register 14 includes an AC flag 16 and an ID flag 18. The AC flag 16 and the ID flag 18 are preferably single bits in the flags register 14. During initialization, flags register 14 is typically loaded with a value particular to the software and hardware. The microprocessor 10 also includes a first general purpose register 20 and a second general purpose register 22. The registers 20, 22 may include any standard read/write register commonly used in microprocessors. Generally, the flags register 14 and the general purpose registers 20, 22 are "visible" to a programmer in assembly language. In other words, a programmer can write to these registers from any other register or memory, or he can read from this register to any other register or memory. These registers may be manipulated, so that selected bits can be read from or written to. The data in such registers may be termed "maskable". The microprocessor 10 may also include a number of additional registers, indicated at 24, which may be used for purposes useful to operate the processor.

The microprocessor 10 also includes a processor ID memory element, for example a processor ID register 30, in which processor ID information 31 is encoded. This ID memory element is not visible to a programmer; i.e., the ID memory element cannot be manipulated directly. For example, the ID memory element cannot be read directly into any other selected register unlike the general purpose registers 20,22. During manufacture of one embodiment of a microprocessor built in accordance with the principles of the present invention, the processor ID register 30 is formed on the microprocessor 10 as a read-only register. In alternate embodiments, the processor ID information 31 may be stored in constant ROM 33 (i.e., read-only memory for data used by the microcode), but preferably it is in the separate register 30 that, for manufacturing reasons, can be modified easier in subsequent models than the constant ROM 33 which is a dense structure and difficult to change. In still other embodiments, the processor ID register 30 may be implemented in more than one register, so that ID information is located in several registers, which serve an equivalent purpose.

The processor ID information 31 as implemented in a processor ID register 30 includes a family field 32 that is indicative of the identified microprocessor's family. Different families are usually distinguished by major architectural differences that provide additional features to applications programmers and systems programmers. The processor ID register 30 may also include a model field 34 that includes data indicative of the model of the microprocessor within the family. For example, in the INTEL microprocessors, the letters "SX™", and "DX™" represent different models within the same family of microprocessors. While different families include different features that are usually apparent to both applications programmers and systems programmers, the differences between models of a microprocessor will likely affect only a systems programmer.

The processor ID register 30 also includes a revision field 36 including data indicative of the microprocessor's stepping ID. When a microprocessor is manufactured, it is identified with a particular stepping ID that represents the version of the microprocessor. Different versions are necessitated by errata, or "bugs" that often unexpectedly arise to adversely affect the microprocessor's operation. Such errata may be the unfortunate result of a development process which often cannot anticipate all possibilities, or may simply represent a manufacturing error that affects the microprocessor's operation. These bugs can be fixed in later models, however earlier models may still be in use. Therefore a stepping ID is implemented to distinguish between the different versions of the microprocessors. Generally the errata will only be evident to systems programmers, however in some instances a complex series of instructions supplied by an applications programmer will also create a problem. Generally, once the existence of a bug has been identified, software fixes are developed to "work around" the bug. These programs are often termed "work-arounds" or "work-around programs". Such programs are common and useful, but may require complex instruction sequences, particularly for the earliest manufactured versions of a microprocessor.

The processor ID register 30 in other embodiments may include additional fields, such as a field indicative of the serial number of a particular microprocessor, or other information useful for identification such as a features field 37 that specifies the existence of specific features. For use in accommodating additional fields that may be implemented in the future, reserved bits 38 are included in the processor ID register 30. The reserved bits 38 are not assigned any meaning or significance unless they are implemented. When bits are marked as reserved or undefined, it is essential for compatibility with future processors that software treat these bits as having a future, through unknown, effect. There should be no software dependence on the reserved bits.

Microprocessor 10 also includes a control unit 40. The control unit 40 includes conventional decoder circuitry 41 for receiving and decoding information. It also includes control logic 42 for executing instructions supplied to it from the decoder 41. The control logic uses microcode 43 for executing instructions as necessary. In the preferred embodiment, the microcode 43 also includes CPUID instruction microcode 44 for executing a CPUID instruction, described in more detail below. In alternate embodiments, circuitry for executing the CPUID instruction may be located wholly within the control logic 42.

Software that executes in the control unit 40, illustrated generally by the programs 12, includes a main program 50, which illustrates any of a number of programs. For example, the main program 50 may include a program that initializes the operating system, BIOS initialization software, or applications programs. The main program 50 supplies instructions to the control unit 40, or alternately, it may select another program to supply instructions to the control unit 40. These programs include a test flag instruction sequence 52 for testing the ID flag 18, and a CPUID instruction 54 which may be a single instruction, for example. Also, the programs 12 include preliminary test instructions 56 for testing whether the microprocessor is basic or advanced. Additional programs, not shown, may also be available.

The microprocessor ID memory element is accessed via a microprocessor CPUID instruction 54. The CPUID instruction 54 is implemented in appropriate circuitry within the control unit 40 that recognizes the opcode of the CPUID instruction 54 in the decoder 41 and executes the appropriate steps in the control logic 42 to supply the identification information 31 in the ID memory element to a general purpose register 20,22, that is visible to a programmer. The identification information 31 is then available to the programmer, and can be manipulated by the programmer for any desired purpose. For example, he may read the data from each field to ascertain which features are appropriate to the identified microprocessor.

In an embodiment wherein the ID information is stored in the processor ID register 30 and the microcode 43 includes the CPUID instruction microcode 44, a microcode sequence is included therein to read the contents of the processor ID register 30 and store them in a general purpose register such as the first general purpose register 20 or the second general purpose register 22. Depending upon the amount of information in the processor ID register 30, the contents may be stored in more than one general purpose register. The microcode 44 functions to specify the registers for the CPUID instruction 54.

In order to read or supply directions to the control unit 40, a user programmer interface 58 may be connected to the microprocessor 10. The interface 58 may be used, for example, to read information stored in one of the registers 20, 22, 24 to a video terminal. Furthermore, the user or programmer interface 58 may include a keyboard for manual access to the content of the registers 20, 22, and 24.

Reference is now made to FIG. 2 which illustrates a computer-implemented method of the preferred embodiment. In order to describe the environment for the method, a box 60 sets a goal of identifying an installed microprocessor in a computer. The installed microprocessor may be a member of a basic set of families or an advanced set of families. All families are compatible with each other, however in the advanced families, more features and more instructions are often available than in the basic set of families. The basic set of families does not have a bit location for the ID flag 18 in the flags register 14, and therefore any attempt to test the ID flag 18 may create an illegal opcode exception. The advanced set of families does have a bit location for the ID flag 18. Within the advanced set of families there are two groups: a first group that does not have a processor ID instruction, and a second group that does implement a processor ID instruction. The CPUID instruction 54 is available only in the second group of the advanced families: it is not available in the basic families nor in the first group of the advanced families. If running the CPUID 54 instruction is attempted in the basic families or in the first group of advanced families, then an attempt to execute a CPUID instruction 54 would unfortunately create an illegal opcode exception and likely transfer control to an exception handler which would in all likelihood terminate the program. To avoid the possibility of creating an illegal opcode exception, the following steps are provided.

In execution box 62, the test instruction sequence 56 is executed to determine whether the processor is from the basic set of families or the advanced set of families. As illustrated in decision box 64, if the processor is from the basic set of families, then operation proceeds to the box 66, in which other conventional tests may be performed as necessary to further identify the basic processor. Of course it will be apparent that, if it is determined before starting operation in the box 60 that the processor is already a member of the advanced set of families, then operation can skip directly to the box 68 which tests to determine if the processor has implemented the CPUID instruction 54.

Branching the other direction from the box 64, if the processor is from an advanced set of families, then a further test is performed as illustrated in a box 68 to determine if a processor has a processor ID instruction, by executing the test ID flag instruction sequence 52. As illustrated in decision box 70 if it is determined that the ID flag 18 has not been set, then as illustrated in block 72 it is determined that the processor 10 is from the advanced set of families, but the CPUID instruction 54 is unavailable because it has not been implemented. Therefore, the subsequent CPUID instruction 54 must not be executed. However, if in the decision box 70 it is determined that the ID flag 18 has been set, then the processor 10 has implemented the CPUID instruction 54. Therefore, as illustrated in a box 74, the CPUID instruction 54 is executed to read the processor ID information 31 into a general purpose register, such as the registers 20, 22, or 24. Thus, the family, model, and stepping ID of the installed microprocessor have been identified. The features field 37 may also be read into one of the registers 20, 22, 24 to further identify features available in that microprocessor. For future expansion, the contents of the second general purpose register 22 are cleared to accommodate additional identification data that may be stored in the reserved bits 38 (FIG. 1), or any other location that may be implemented in future models. In the preferred embodiment, the contents of two additional registers that may be included in the other registers 24 (FIG. 1) are cleared to provide an opportunity for future implementation. Following that, as illustrated in a box 76, features appropriate to the microprocessor are enabled. Nonfunctional features are disabled, and appropriate work arounds are also enabled. This will be discussed in more detail with reference to FIGS. 3 and 4. Operation then continues.

Reference is again made to FIG. 2. The following description, with reference to the INTEL families, describes an exemplary basic set of families, and the first and second groups of the advanced set of families.

In a basic set of families such the INTEL microprocessors having numbers 80286 and below, the ID bit 18 does not physically exist because the EFLAGS register in which it resides has a smaller, 16-bit size. Therefore an attempt to execute an ID test bit instruction sequence 52 in those basic families would likely generate an illegal opcode. However, in advanced families such as the i386™ microprocessor family and the i486™ microprocessor family, the EFLAGS register was enlarged to a 32-bit size. A number of these bits were reserved for use in later models or families, and therefore these bits cannot be set. The reserved bits may be still be read or written without generating an exception, but they will always return the same value. An attempt to set or reset a reserved bit will simply have no effect. Because the reserved bit physically exists, an attempt to execute an ID test bit instruction sequence in these advanced families will not generate an exception.

In the preferred embodiment in the INTEL architecture, the ID bit 18 is implemented in the EFLAGS register in a bit that was originally reserved in the i386™ microprocessor family and the i486™ microprocessor family. Therefore, the ID test bit instruction sequence 52 will not generate an exception when executed in these families. Furthermore, execution of the ID test bit instruction sequence 52 will indicate whether or not the CPUID instruction 54 is available. For purposes of the present disclosure, microprocessor families such as the i386™ family and the i486™ family in which the ID bit were not implemented are exemplary of the "first group of the advanced families". Microprocessors in which the ID bit 18 is implemented, and which implement the CPUID instruction 54 are exemplary of "the second group of the advanced families". Later versions of the i386™ and i486™ microprocessors, manufactured subsequently, may incorporate the ID bit 18 in conjunction with the CPUID instruction and a processor ID register. These subsequently manufactured microprocessors would be members of the second group.

Reference is now made to FIG. 3 which is a flow chart illustrating different uses for the processor identification method described herein. Beginning on the left of FIG. 3 in a block 80, at the startup of operations identification of the microprocessor 10 is often useful. For example, startup of operations may utilize a BIOS code that is run following power up of a microprocessor 10. Following that, as illustrated in a box 82, the microprocessor 10 is identified. Then, in a box 84, the microprocessor's features are determined. Subsequently, as illustrated in a box 86, features are enabled suitable for that microprocessor, work-around programs are implemented and nonfunctional features are disabled, as appropriate. An exemplary microprocessor feature whose enablement is processor-dependent, and a work-around program are discussed below in the discussion accompanying FIG. 4.

In addition to the usefulness of identifying a microprocessor 10 following start up, it may also be useful to identify the microprocessor whenever device drivers for external hardware are initialized. For example, a printer driver may want to know or identify the microprocessor that is operating it. In this event, it would then follow the sequence of operations 82, 84, 86 to identify the microprocessor 10 and enable appropriate features. The device driver initialization is illustrated in a block 90. Furthermore, upon operating system startup as illustrated in a box 92, it may also be useful to identify the microprocessor and enable features as illustrated in the blocks 82, 84, and 86. Similarly, as illustrated in a box 94, upon applications program startup it may also be useful to identify the microprocessor 10 and enable features as illustrated in the blocks 82, 84, and 86.

The examples in which it is useful to identify the microprocessor 10, including the block 80,90,92, and 94 are only illustrative of the uses for the identification method described herein. The method may be utilized at any time during the microprocessor's operation, for example, it may be useful to identify the processor during program operation to ascertain whether or not a particular instruction or a particular sequence of instructions can be used, or whether to execute other instructions. In that event, the steps 82, 84, and 86 can be performed to identify the microprocessor 10 and enable appropriate features.

Reference is now made to FIG. 4, which is a flow chart illustrating enablement of features in the preferred embodiment that includes a high performance microprocessor. In a box 100, it is assumed that the CPUID instruction 54 has been executed, and the ID information 31 is available in one or more general purpose registers. In the box 100, execution of a program to enable features is started. In a step 102, the family field 32 and the model field 34 are read, to provide an indication of the architectural capabilities of the microprocessor. In the next step 104 the instructions appropriate to the indicated family and model are enabled. In a next step 106, the stepping ID field (the revision field 36) is read to provide information regarding the errata appearing on the identified version of the microprocessor. In a next step 108, features are enabled, disabled, or modified to compensate for the identified errata. This step 108 may include installing work-around programs as appropriate. Thus, the capabilities of the high performance microprocessor can be effectively utilized.

In the steps 102 and 104, the microprocessor is identified and its appropriate instructions are enabled. As an example, an improved INTEL microprocessor implements an instruction with the syntax "RDMSR", for Read from Model-Specific Register. In operation, the RDMSR instruction takes the value from a model-specific register specified in a first general purpose register (the "ecx" register), and places the high-order bits in a second general purpose register (the "edx" register) and the low-order bits in a third general purpose register (the "eax" register). A "WRMSR" instruction performs a Write from Model-Specific Register using the same registers. Examples of model-specific registers are test registers such as cache test registers. In an earlier INTEL microprocessor, the i486™ microprocessor, these test registers were accessed by a separate, dedicated "TR" command. Therefore, if a programmer needs to access these test registers, he must first identify the microprocessor, and then he will know whether the RDMSR instruction will supply him with the information he needs. If the microprocessor is identified to be the improved microprocessor, then the RDMSR and the WRMSR instructions will be chosen. However, if the microprocessor is identified as a i486™ microprocessor, then the dedicated TR commands will be chosen.

In the steps 106 and 108, the stepping ID is provided, and a program is initiated to work-around errata in the microprocessor. An example of a work-around program follows, in the context of a problem that arose with the i386™ DX™ microprocessor. In a given microprocessor, there may be many of these errors.

Under certain conditions when the POPA or POPAD instruction is used, the i386™ DX™ microprocessor executes improperly. The i386™ DX™ microprocessor inadvertently corrupts the EAX register when either the POPA or POPAD instruction is immediately followed by an instruction that uses a base address register AND an additional register other than EAX or AX as an index register to form its effective address.

The following sample code is an example of the problem:

MOV EDX,4

POPAD

MOV EBX, dword ptr [EDX+EBX*4]

Additionally, whenever a POPA (16-bit version) instruction is immediately followed by an instruction which uses the EAX (32-bit register) as a base or index register to form its effective address, the i386™ DX™ microprocessor will hang.

The following sample code is an example of the problem:
MOV EAX,4
POPA
MOV EBX, dword ptr [EAX]

Depending on the above conditions, the EAX register will contain an undefined value or the processor will stop execution. Proper operation of the processor cannot be guaranteed after this sequence is executed until a hardware reset occurs. This sequence of instructions can occur in the Real, Protected and Virtual 86 modes of the i386™ DX™ microprocessor.

Therefore, it is important never to execute the described instruction sequences. A workaround code sequence which has proven to be successful in all cases is to insert a NOP instruction after every POPA(D) instruction. Examples are shown below:

EXAMPLE 1

MOV EDX, 4
POPAD
NOP
MOV EBX, dword ptr [EDX+EBX*4]

EXAMPLE 2

MOV EAX,4
POPA
NOP
MOV EBX, dword ptr [EAX]

In summary, an identification method and apparatus is provided that does not generate an illegal opcode exception. The method is compatible with both basic and advanced microprocessors. If it is determined that the microprocessor is advanced, the method determines whether they are members of the first group that does not implement the ID instruction, or members of the second group that do implement the ID instruction. The apparatus can be implemented in all advanced microprocessors to enable easy identification to a programmer or anyone who wants to know that information. Even if the microprocessor were originally manufactured as a member of the first group of the advanced families and therefore did not implement the microprocessor ID instruction, subsequent manufacturing runs for that microprocessor can incorporate the identification apparatus. Once the microprocessor has been identified, a program can better utilize the microprocessor's features. Particularly, if the microprocessor is precisely identified, then additional features can be enabled commensurate with the microprocessor's greater capabilities. Thus, the microprocessor's capabilities can be efficiently and quickly utilized.

Appendix 1 discloses an exemplary program written to distinguish between an i386™ microprocessor, an i486™ microprocessor, and an improved microprocessor, all of which are "advanced" by the foregoing definitions. The i386™ and i486™ microprocessors fall into the first group because they have a 32-bit EFLAGS register but do not implement a CPUID instruction 54, and the improved microprocessor falls into the second group because it does implement the CPUID instruction 54. If the processor is identified as the improved microprocessor, then the identification information is moved to identify the variables including the stepping ID, model and family.

Appendix 2 discloses an exemplary program written to distinguish between a basic and an advanced processor. In terms of the program, a basic processor includes the 80286 and the 8086 microprocessor families, and an advanced processor includes the i386™ microprocessor family. If the program determines that the processor is a 80286 or an 8086 microprocessor, then the processor is a basic processor. But if the program determines that the processor is an i386™ microprocessor, then the processor is "advanced" and may in fact be the i486™ microprocessor or from a future family. Appendix 2 is an an example of an ad hoc program that has been used to determine processor type.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

APPENDIX 1

PROGRAM EXAMPLE USING CPUID INSTRUCTION

```
EFL_AC    EQU 40000H              /alignment check (1→check)
EFL_ID    EQU 200000h             /cpuid opcode (1→supported)
cpu_family   D D ?
cpu_model    D D ?
cpu_stepping D D ?
pushf                             /push FLAGS value on stack
pop        eax                    /get FLAGS into AX
push       eax                    /save original FLAGS
mov        ecx, eax               /save copy of FLAGS
xor        eax, EFL_AC            /flip AC bit for new FLAGS
push       eax                    /push new value on stack
popf                              /attempt setting FLAGS.AC
pushf                             /push resulting FLAGS on stack
pop        eax                    /get that into AX
cmp        eax, ecx               /succeeded in flipping AC?
je         cpu_is_386             /AX is same as CX for i386 cpu
mov        eax, ecx               /get original FLAGS again
xor        eax, EFL_ID            /flip ID bit for new FLAGS
push       eax                    /push new value on stack
popf                              /attempt setting FLAGS.ID
pushf                             /push resulting FLAGS on stack
pop        eax                    /get that into AX
cmp        eax, ecx               /succeeded in flipping ID?
je         cpu_is_486             /AX is same as CX for i486 cpu
cpuid                             /get cpu family-model-stepping
                                  /(sets eax, ebx, ecx, edx!)
mov        ebx, eax               /extract stepping id
and        ebx, 00Fh              /   from bits [3:0]
mov        cpu_stepping, ebx
mov        ebx, eax               /extract model
and        ebx, 0F0h              /   from bits [7:4]
shr        ebx, 4
mov        cpu_model, ebx
mov        ebx, eax               /extract family
and        ebx, F00h              /   from bits [11:8]
shr        ebx, 8
mov        cpu_family, ebx
jmp        cpu_identified
cpu_is_486:
mov        cpu_family, 4
jmp        cpu_identified
cpu_is_386:
mov        cpu_family, 3
cpu_identified:
popf                              /restore original FLAGS
```

APPENDIX 2

PROGRAM EXAMPLE TO DISTINGUISH BETWEEN BASIC AND ADVANCED PROCESSOR

```
;           DISTINGUISHES BETWEEN ADVANCED PROCESS
            (i386 ™ and above), 80286 and 8086
            pushf           ; save FLAG register
            pop bx          ; store FLAGs in BX
            and bx, 0ffh    ; clear bits 12–15
            push bx         ; store on stack
            popf            ; pop word into the FLAG register
            pushf           ; store FLAGs on stack
            pop ax          ; recover FLAG word
            and ax, 0f000h  ; if bits 12–15 are set, then the
            cmp ax, 0f000h  ;    processor is an 8086
            jz is_8086      ;
            or bx, 0f000h   ; try to set FLAG bits 12–15
            push bx         ; store on stack
            popf            ; pop word into the FLAG register
            pushf           ; store FLAGs on stack
            pop ax          ; recover FLAG word
            and ax, 0f000h  ; if bits 12–15 are cleared, then
            jz is_80286     ;    the processor is an 80286
is_80386:                   ; else the processor is "advanced"
mov ax, 386h                ; set the 386 DX CPU indicator
jmp done
is_80286:
            mov ax, 86h     ; set the 8086 indicator
done:
            popf            ; record FLAG register
            ret
is_386      endp
```

What is claimed is:

1. In a microprocessor formed on an integrated circuit, an identification apparatus for identifying the microprocessor in response to a supplied ID instruction, said identification apparatus comprising:

a first register for storing and reading data;

a read-only memory storing microprocessor ID data including data fields that identify the microprocessor type;

a decoder for receiving and decoding an ID instruction; and control circuitry coupled to the first register, the read-only memory and the decoder, including ID instruction execution means responsive to a decoded ID instruction including for executing the ID instruction received from the decoder, including reading the microprocessor ID data from the read-only memory and storing said microprocessor ID data in the first register.

2. The microprocessor of claim 1 wherein the read-only memory includes a processor ID register formed in the microprocessor.

3. The microprocessor of claim 1 further including a control ROM and a microcode memory, wherein the microprocessor ID data is stored in said control ROM.

4. The microprocessor of claim 1 further comprising:

a read/write memory element including an ID flag indicative of the existence of said control circuitry for executing an ID instruction; and a test means for testing the ID flag.

5. The computer microprocessor of claim 4 wherein the read/write memory element comprises a control register, and the ID flag comprises one of the bits of said control register.

6. The microprocessor of claim 1 wherein the data fields in the read-only memory include:

a family field for storing data indicative of the family of the microprocessor;

a model field for storing data indicative of the model of the microprocessor; and a revision field for storing data indicative of the stepping ID of the microprocessor.

7. The microprocessor of claim 6 wherein the read-only memory includes reserved bits that are not implemented, whereby the reserved bits have a position within the read-only memory.

8. The microprocessor of claim 7, further including a second general purpose register, and wherein the ID instruction execution means includes means for clearing said second general purpose register.

9. In a computer microprocessor, an identification apparatus for identifying the computer microprocessor in response to a CPUID instruction, said identification apparatus comprising:

a general purpose register for storing and reading data;

a microprocessor ID memory element for storing microprocessor ID data including data fields that identify the microprocessor type;

a decoder for receiving instructions;

a control means for executing instructions received from the decoder, said control means including CPUID executing means for executing a CPUID instruction that reads the microprocessor ID data from the ID memory element and supplies said microprocessor ID data to the general purpose register;

a read/write memory element including an ID flag indicative of the existence of said microprocessor ID memory element and said CPUID executing means;

test program means for supplying a sequence of instructions to the decoder and the control means, said sequence including instructions to read said read/write memory element and for testing the ID flag to ascertain the existence of said microprocessor ID memory element; and program means responsive to the test program means for supplying the CPUID instruction to the decoder and the control means.

10. The microprocessor of claim 9 wherein the microprocessor ID memory element includes a processor ID register formed in the microprocessor.

11. The microprocessor of claim 10 wherein the microprocessor ID memory element includes reserved bits, so that the reserved bits have a position within the microprocessor ID memory element but are not assigned a meaning.

12. The microprocessor of claim 9 further including a control ROM and a microprocessor, and the microprocessor ID data is stored in said control ROM.

13. The computer microprocessor of claim 9 wherein the data fields include:

a family field for storing data indicative of the family of the computer microprocessor;

a model field for storing data indicative of the model of the computer microprocessor; and a revision field for storing data indicative of the version of the computer microprocessor.

14. The microprocessor of claim 9, further including a second general purpose register, and wherein the CPUID executing means includes means for clearing said second general purpose register.

15. A computer-implemented method for identifying a microprocesser that is a member of a set of microprosser families comprising a first group that does not implement a microprosser ID instructing and a second group that does not implement the micrprosser ID instruction, said method comprising the steps of:

(a) executing a flag test instruction sequence that tests an ID flag to determined wheather the microprosser is in the first group or the second group;

(b) if execution of said flag test instruction sequence in the step (a) indicates that the microprocessor is in the first group, then avoiding execution of a microprocessor ID instruction following the flag test instruction sequence; and (c) if execution of said flag test instruction sequence in the step (a) indicates that the microprocessor is in the second group, then executing a microprocessor ID instruction following the flag test instruction sequence to load the contents of a microprocessor ID memory element within said microprocessor that includes microprocessor ID data indicative of microprocessor type to a general purpose register.

16. The computer-implemented method of claim 15 further comprising the step of applying the microprocessor ID data to enable a microprocessor feature appropriate to the identified microprocessor.

17. The computer-implemented method of claim 15 wherein the microprocessor ID data includes stepping ID identification information indicative of the errata of the microprocessor, and the method further comprises the step of applying the stepping ID information to implement a work-around program for the errata.

18. The computer-implemented method of claim 15 wherein the step (c) includes clearing a second general purpose register.

19. The computer implemented method of claim 15 wherein the step (b) includes executing an instruction that reads data fields including a family field, a model field, and a revision field of the microprocessor ID memory element to the general purpose register.

20. The computer implemented method of claim 19 further comprising the steps of:

(d) examining the family field and the model field in the general purpose register; and (e) enabling features of the microprocessor appropriate to the family and model of the identified microprocessor.

21. The computer implemented method of claim 20 further comprising a step (f) of examining the revision field, and enabling a work-around program appropriate to the identified microprocessor version.

22. A computer-implemented method for identifying a microprocessor that is a member of a set of compatible microprocessor families including an advanced set of families having an ID flag location in a flags register and a basic set of families not having an ID flag location in the flags register, the advanced set of families including a first group that does not implement a microprocessor ID instruction and a second group that does implement the microprocessor ID instruction including a microprocessor ID memory element storing microprocessor ID data including data fields that identify the microprocessor type, said method comprising the steps of:

(a) determining if the microprocessor is a member of the basic set of families or a member of the advanced set of families;

(b) if said microprocessor is a member of the advanced set of families, then (b)(i) executing a flag test instruction sequence that tests an ID bit to determine whether the microprocessor is in the first group or the second group of the advanced set of families, (b)(ii) if execution of said flag test instruction sequence in the step (b)(i) indicates that the microprocessor is in the first group, then preventing execution of a microprocessor ID instruction following the test bit instruction, and (b)(iii) if execution of said flag test instruction sequence in the step (b)(ii) indicates that the microprocessor is in the second group, then executing a microprocessor ID instruction following the test bit instruction to supply the contents of said microprocessor ID memory element to a programmer; and, (c) if the microprocessor is a member of the basic set of families, then avoiding execution of an instruction that would otherwise test the ID bit, and avoiding execution of the microprocessor ID instruction.

23. The computer implemented method of claim 22 further comprising a step (d) of enabling a feature of the microprocessor appropriate to the microprocessor identified by the microprocessor ID memory element, and enabling a work-around program as appropriate to the identified microprocessor.

24. The computer implemented method of claim 22 wherein the step (b) includes executing an instruction that reads data fields including a family field, a model field, and a revision field of the microprocessor ID memory element to the register.

25. The computer implemented method of claim 24 further comprising a step (d) of reading the family field and the model field but not the revision field, and enabling a feature of the microprocessor appropriate to the family and model of the identified microprocessor.

26. The computer implemented method of claim 25 further comprising a step (e) of reading the revision field but not the family field or the model field, and enabling a work-around program appropriate to the identified microprocessor.

* * * * *

UNITED STATES PATENT AND TRADEMARK OFFICE
CERTIFICATE OF CORRECTION

| | | |
|---|---|---|
| PATENT NO. | : 5,790,834 | Page 1 of 1 |
| APPLICATION NO. | : 07/938288 | |
| DATED | : August 4, 1998 | |
| INVENTOR(S) | : Dreyer et al. | |

It is certified that error appears in the above-identified patent and that said Letters Patent is hereby corrected as shown below:

In claim 1, column 13, line 44, please delete "including for executing" and replace with --for executing--.

Signed and Sealed this
Third Day of April, 2012

David J. Kappos
*Director of the United States Patent and Trademark Office*